Sept. 13, 1927.    G. H. ELLINWOOD    1,642,541
VULCANIZATION
Original Filed April 28, 1922
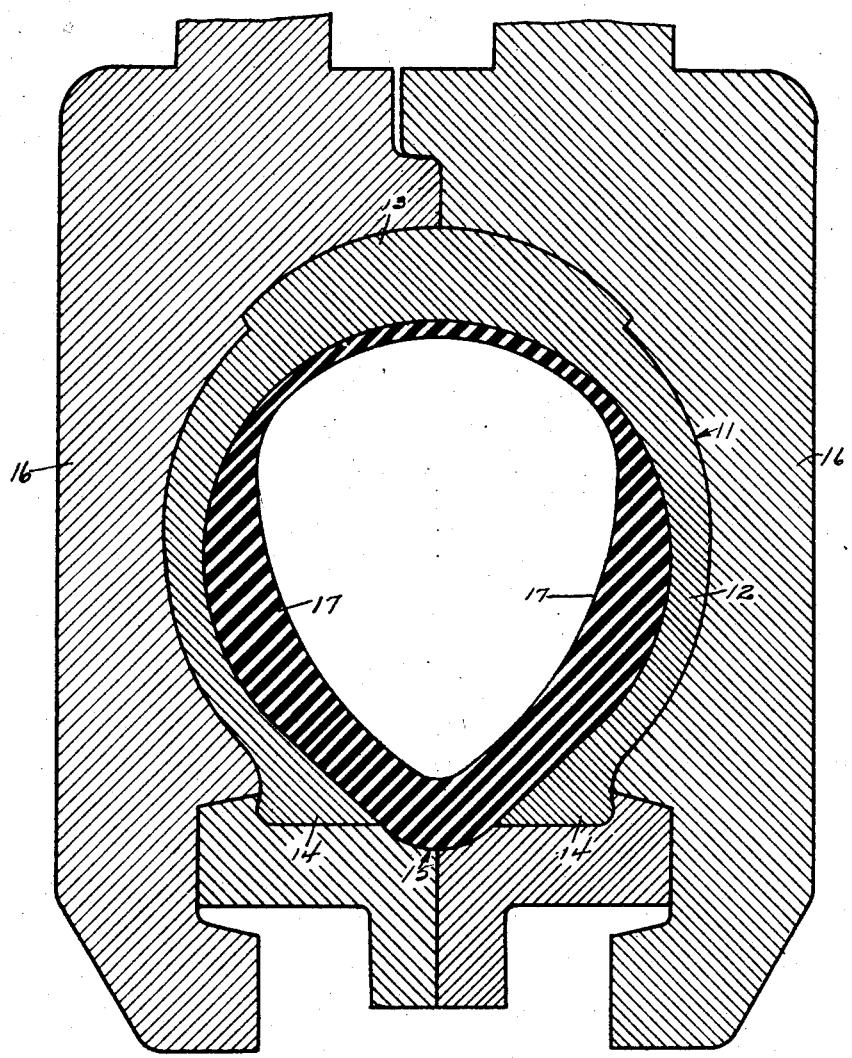
GEORGE H. ELLINWOOD
INVENTOR
BY
ATTORNEY Patented Sept. 13, 1927.

1,642,541

UNITED STATES PATENT OFFICE.

GEORGE H. ELLINWOOD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VULCANIZATION.

Application filed April 28, 1922, Serial No. 557,212. Renewed March 4, 1927.

In the vulcanization of articles by heat it is found that thin places in the articles are usually relatively overcured unless slower curing stock is used at these places. The use of such stock, while compensating roughly, does not compensate exactly especially in those cases where the change in thickness is gradual. Furthermore, the use of a plurality of stocks not only complicates the construction and increases the cost but fails to eliminate the risk of burning. Upon investigation of this problem I find that the increase in the rate of cure at the thin places is apparently due to the increased temperature at such places resulting from the application of the same amount of heat to a place having less volume and therefore less heat capacity. At any rate I find that when a thin place is backed by a pad which compensate for the decrease in thickness in the article, the thin place in the article cures at substantially the same rate as the thicker portions of the article and I therefore find that the rate of cure of any section of an article may be decreased by applying a heat absorbing pad to the article at that section. In the drawings accompanying this specification and forming a part thereof I have shown, for purposes of illustration, one form which my invention may assume. In these drawings the single figure represents a cross-section of a tire cured in accordance with my invention.

The tire 11 herein shown is provided with the usual relatively thin sides 12 and relatively thickened tread 13 and beads 14. When this tire is constructed of stocks having the same rate of cure and is cured in the usual manner, as on an air bag 15 in a mold 16, the sides 12 will usually be relatively overcured. However, if the air bag 15 is thickened adjacent the sides 12 as shown at 17 the additional heat capacity provided by the bag will decrease the temperature in the sides 12 to thereby prevent burning. In other words, the use of the thickened air bag as a pad at the sides eliminates the relative overcuring and the risk of burning and permits the use of the same stock throughout.

I have described my invention as applied to a tire. The disclosure herein is, however, illustrative only and my invention is not limited thereto.

I claim:—

1. The method of uniformly curing a tire casing which comprises supporting said casing upon an air bag of increased thickness opposite those portions of the tire where the rate of cure is normally rapid and submitting the so supported casing to vulcanizing temperature.

2. The method of uniformly curing a tire casing which comprises supporting said casing upon an air bag of increased thickness along the sides and subjecting the so supported casing to vulcanizing temperature.

3. A fluid pressure bag, adapted to support a tire casing during vulcanization, the entire side walls of which are of substantially greater thickness than the crown portion of the bag.

4. A fluid pressure bag, adapted to support a tire casing during vulcanization, the walls of which increase in thickness from the base of the bag to a maximum thickness at the sides and decrease in thickness from the sides to a minimum thickness at the crown of the bag.

5. The method of uniformly curing a tire casing which comprises supplying heat to the outside of the casing, and absorbing heat from the inside of the casing in varying amounts, the degree of absorption varying in substantially inverse proportions with the thickness of the casing at the points effected.

6. The method of uniformly curing a tire casing which comprises supplying heat to the outside of the casing, and absorbing heat from the inside of the casing in varying amounts, the absorption of heat being greatest at those points where the tire is thinnest.

In testimony whereof I have signed my name to the above specification.

GEORGE H. ELLINWOOD.